March 25, 1941. W. G. FROHWITTER 2,235,988
CENTRIFUGAL DRIER OR EXTRACTOR
Filed July 24, 1939 5 Sheets-Sheet 1
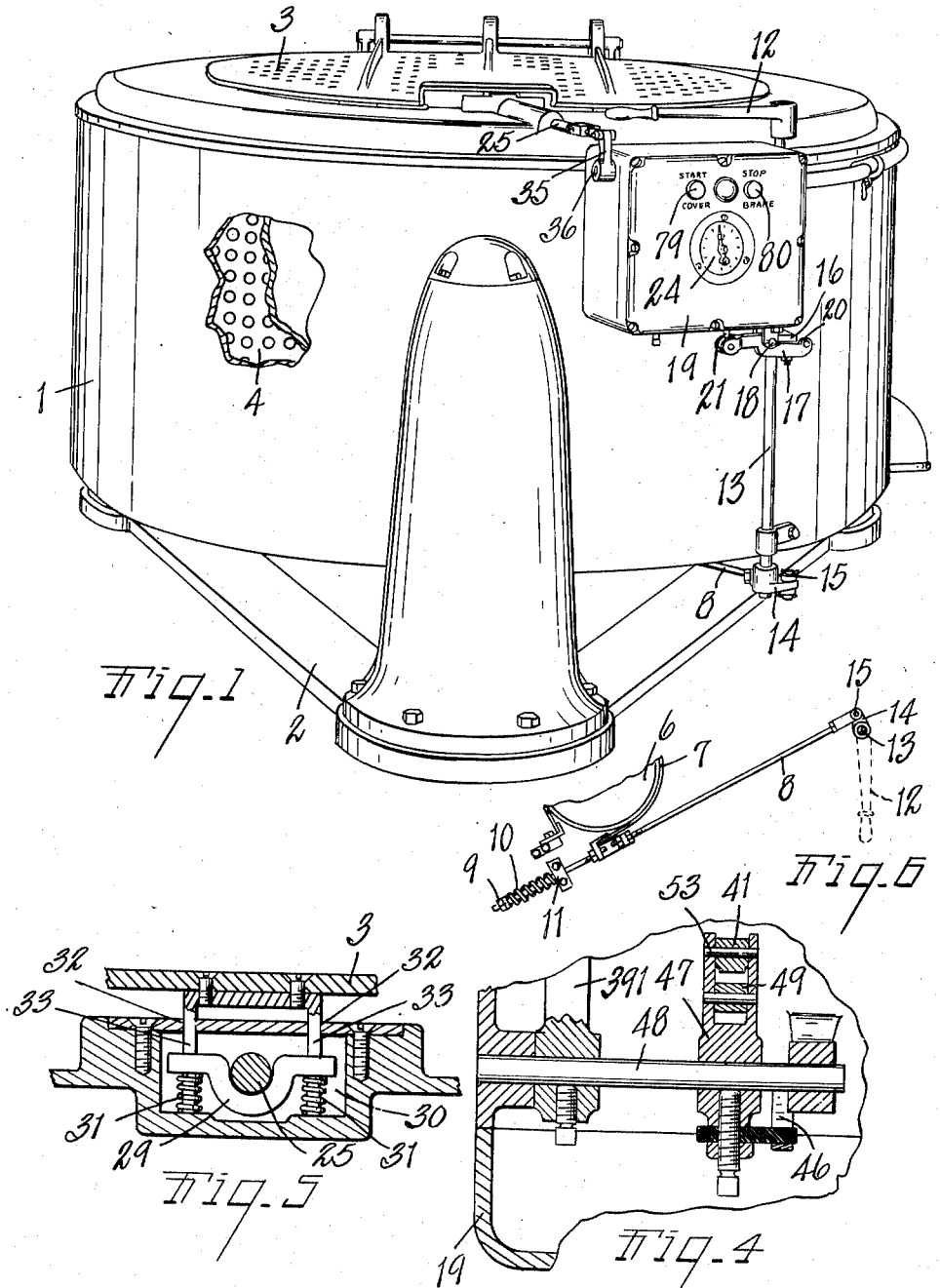
INVENTOR.
William G. Frohwitter
BY Earl & Chappell
ATTORNEYS.

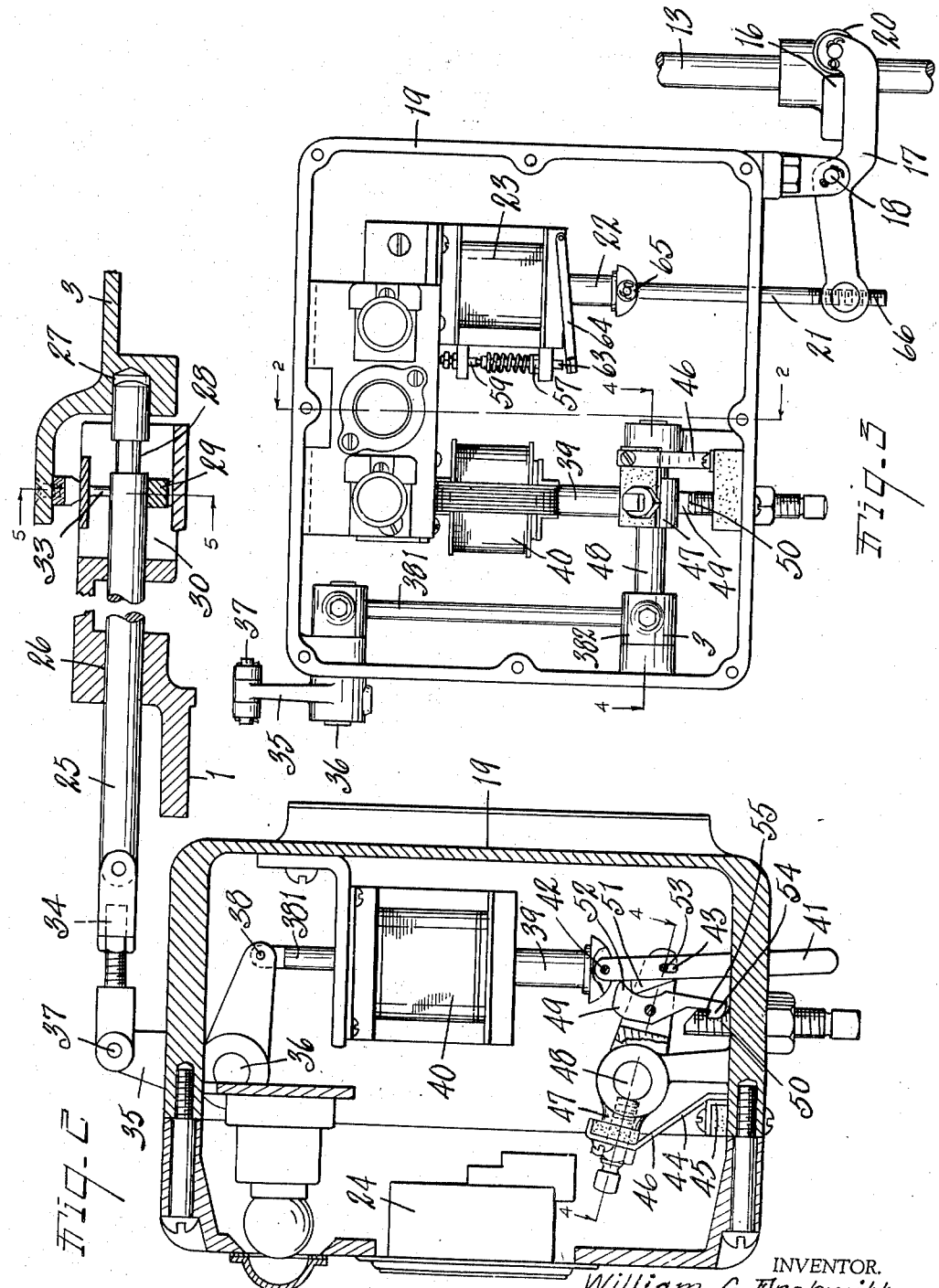

March 25, 1941. W. G. FROHWITTER 2,235,988
CENTRIFUGAL DRIER OR EXTRACTOR
Filed July 24, 1939 5 Sheets-Sheet 3

INVENTOR.
William G. Frohwitter
BY Earl + Chappell
ATTORNEYS.

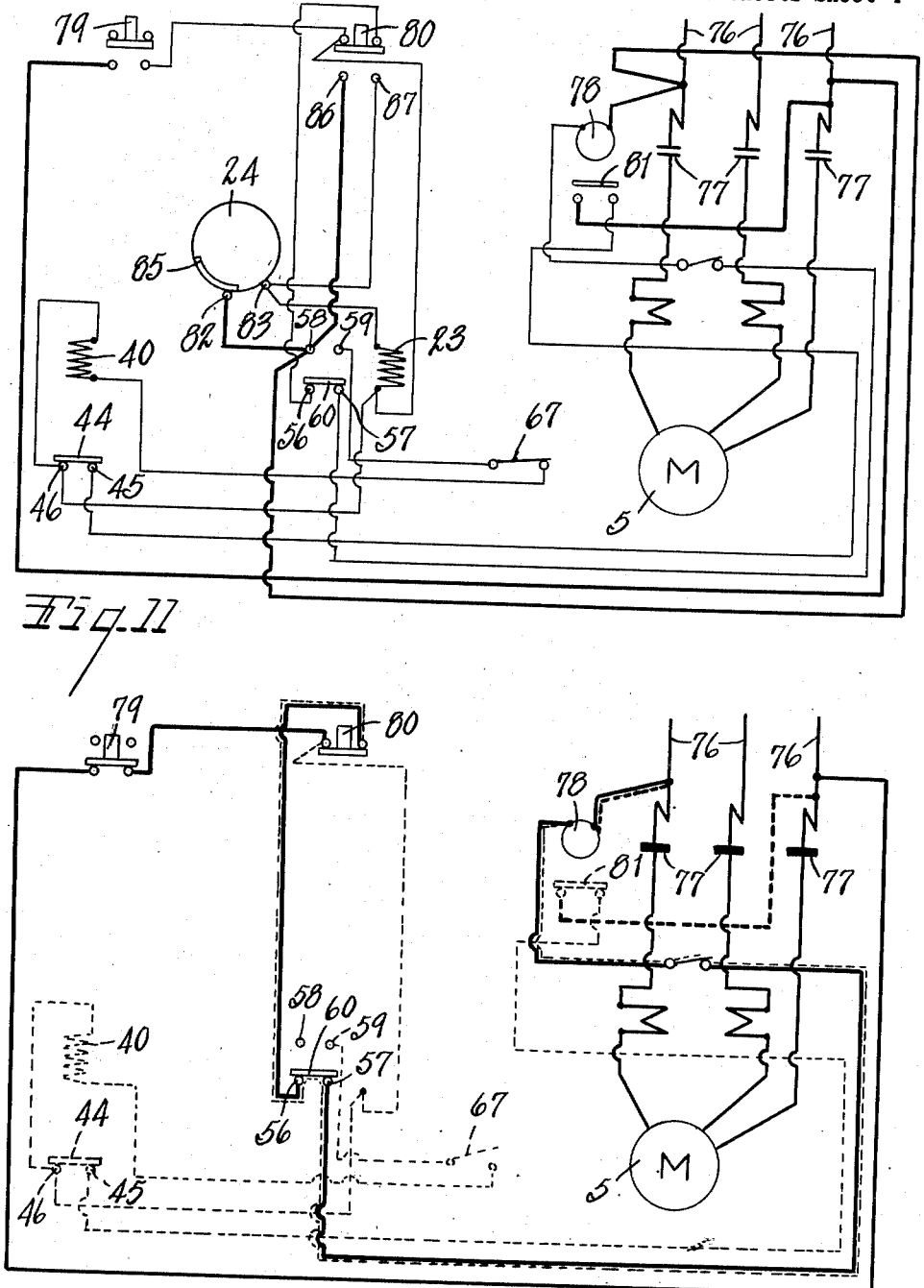

March 25, 1941.    W. G. FROHWITTER    2,235,988
CENTRIFUGAL DRIER OR EXTRACTOR
Filed July 24, 1939    5 Sheets-Sheet 5

INVENTOR.
William G. Frohwitter
BY Earl & Chappell
ATTORNEYS.

Patented Mar. 25, 1941

2,235,988

UNITED STATES PATENT OFFICE 2,235,988

CENTRIFUGAL DRIER OR EXTRACTOR

William G. Frohwitter, St. Joseph, Mich., assignor to St. Joe Machines, Inc., St. Joseph, Mich.

Application July 24, 1939, Serial No. 286,127

10 Claims. (Cl. 210—72)

This invention relates to centrifugal driers or extractors such as are used in laundries and particularly to automatic safety controls therefor. It has for its objects:

First, to produce new and improved controls for an apparatus of the class described.

Second, to provide such controls which automatically apply the brake to stop the machine after a given time has passed and which lock the cover of the machine in place to prevent its removal until the machine has come practically to a stop.

Third, to provide such controls which make it impossible to start the machine until the cover is in place and is locked to prevent removal.

Fourth, to provide such controls which are operated electrically and by means of solenoids.

Other objects and advantages pertaining to details and economies of construction and operation will appear from the description to follow. The invention is defined in the claims. A preferred embodiment of my invention is illustrated in the accompanying drawings, in which:

Fig. 1 is an elevational view of my machine showing the control apparatus in operative position.

Fig. 2 is a detail sectional view taken on line 2—2 of Fig. 3, showing the means for locking the cover of the device in position and the controls for said device.

Fig. 3 is a detail sectional view through the control casing showing the details of the brake control mechanism.

Fig. 4 is a detail sectional view taken on line 4—4 of Fig. 2, showing the details of a safety switch in the starting line.

Fig. 5 is a detail sectional view taken on line 5—5 of Fig. 2, showing the automatic catch for the cover locking mechanism.

Fig. 6 is a detail plan view showing the brake mechanism.

Fig. 11 is a complete wiring diagram for my apparatus.

Fig. 12 is a schematic drawing showing the circuits involved in starting and in maintaining my apparatus in operation.

Figure 7:
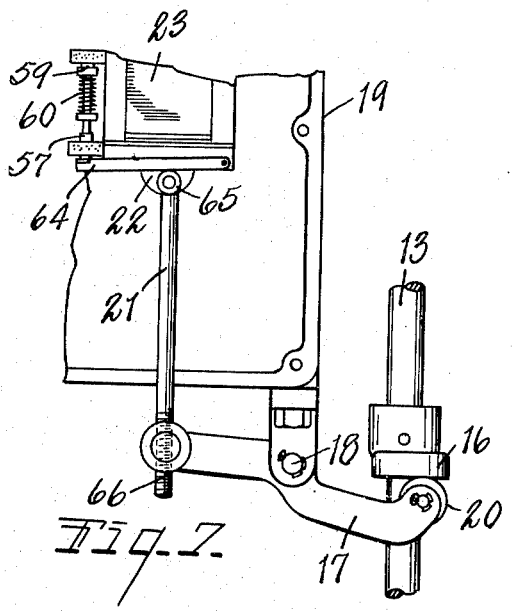
Fig. 7 is a detail view of the mechanism shown in the lower right hand portion of Fig. 3 when the brake mechanism is in operation.

My improved apparatus consists of a tub 1 mounted on a suitable base 2 and having a hinged cover 3. Within the tub is a rotary container 4 for the clothes or the like which are to be dried. This container is mounted in a conventional manner and is driven by a motor 5. Operatively connected to the container is a brake drum 6 surrounded by a suitable band 7, which is fastened to a brake rod 8 provided with the nuts 9 at the end thereof against which a compression spring 10 operating against a stop 11 pushes to set the brake.

The spring 10 normally urges the brake to set position, but the brake may be held in off position by means of a lever 12 on a rotatable shaft 13 to which lever 14 is fastened. The brake rod 8 is suitably fastened at 15 to the lever 14.

When the brake rod 12 is set in the position shown in Fig. 1, the brake is in off position. A suitable catch shown in Figs. 3 and 7 holds the brake in released position as shown in Fig. 3. The catch consists of a cam 16 fixed on the shaft 13 and engageable with a lever 17 which is pivoted at 18 to the control casing 19. A roller 20 is provided at one end of the lever 17 to engage the cam 16 and the lever is so formed that when the brake is in off position it holds the cam 16 in the position shown in Fig. 3. The opposite end of the lever 17 is connected to a rod 21 which is suitably connected to the plunger 22 of the brake solenoid 23, which is so arranged that when the solenoid 23 is energized, the lever 17 is shifted to the position shown in Fig. 7 with the cam 16 riding on the roller 20. The spring 10 which sets the brake rotates the rod 13 to the position shown in Fig. 7 when it applies the brake.

The solenoid 23 is connected to a suitable time switch 24 which will be later described.

The means for holding the cover 3 in position on the tub 1 consists of a plunger 25 mounted in an aperture 26 in the tub and extending into a recess 27 in the tub. In Fig. 2, the plunger 25 is shown in position to lock the cover 3 in place. When the plunger 25 is retracted, as will be later described, the reduced or grooved portion 28 is moved opposite the spring pressed catch 29 which is supported in a recess 30 in the tub by means of compression springs 31.

Directly above the catch 29 are apertures 32 into which pins 33 on the cover 3 extend when the cover is in closed position. When the plunger 25 is retracted and the cover 3 raised, the catch 29 slips into the reduced portion or groove 28 to lock the plunger 25 in retracted position so that it is not possible to move the plunger to the position shown in Fig. 2 until the cover 3 is in position, at which time the pins 33 will move the catch 29 downwardly to release the plunger.

At the outer end 34 of the plunger 25 is a bell crank lever 35 pivoted at 36 and having one arm pivoted as at 37 to the end 34 of the plunger 25 and having its other arm pivoted at 38 to the rod 381 which is connected to the lever 382 on shaft 48. Plunger 39 of the cover solenoid 40 is so arranged that when the solenoid is energized, the plunger 39 moves upwardly to retract the plunger 25 in a manner to be described later.

At the lower end of solenoid plunger 39 is a link 41 pivoted at 42 and provided with a slot 43 forming a portion of a lost motion connection. A switch 44 is mounted in the casing 19 in series circuit relationship in the starting line which will be later described. This switch consists of the stationary contact 45 and the movable arm 46, which is connected to a lever 47 pivoted at 48 and having pivoted thereon a latch member 49 adapted to engage in the adjustable keeper 50 to hold the switch in closed position.

On the link 41 is a cam 51 disposed to engage a projection 52 on the latch member 49. The lever 47 is provided with a pin 53 fitted in the slot 43 and so disposed that when the solenoid 40 is energized to raise the solenoid plunger 39, after cam 51 has engaged projection 52 to release the latch member 49 from its keeper 50, the continued movement of the plunger will rotate the lever 47 in a counterclockwise direction as viewed in Fig. 2 to open the switch 44 to retract plunger 25 through rotary shaft 48 and actuating lever 382, rod 381 and bell crank lever 35. When the plunger 25 is moved to position to lock the cover in place, the plunger 39 moves downwardly and the switch 44 is moved to closed position, as shown in Fig. 2.

It will be noted that the keeper engaging hook 54 of the catch lever 49 has an upwardly slanting face which cooperates with a downwardly slanting face of the hook 55 of the keeper 50 to hold the catch positively in engagement until the solenoid plunger 39 moves upwardly, and, that by so arranging the hooks, the engagement of the catch is such that an increased pull on the catch merely tends to make it more positive in its action.

On the brake solenoid 23 and operated thereby is a switch mechanism consisting of poles 56 and 57 which are disposed in series circuit relationship with the motor control circuit, as will be later described, and contacts 58 and 59 which are in series circuit relationship with the cover solenoid 40, as will be later described.

Figure 8:
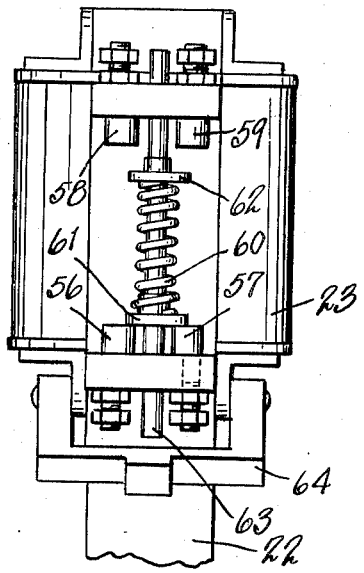
Fig. 8 is a view taken from the left side of the brake control solenoid as shown in Figs. 3 and 7.
Figure 9:
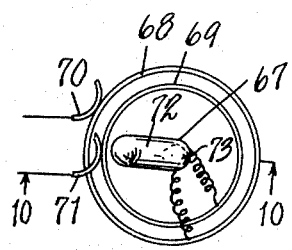
Fig. 9 is a top plan view of the centrifugal motor switch.
Figure 10:
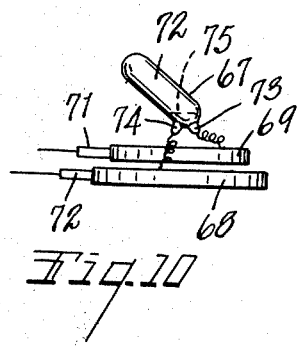
Fig. 10 is a detail sectional view taken on the line 10—10 of Fig. 9.

A contact member 60 having a member 61 adapted to connect contacts 56 and 57 and a contact 62 adapted to connect contacts 58 and 59 and including a projecting actuating rod 63 are provided. A pivoted yoke 64 is disposed to engage the actuating rod 63. When the brake solenoid is not energized and the plunger 22 is in down position, the member 60 is disposed as shown in Fig. 8 with the contact between contacts 56 and 57 established. When the solenoid 23 is actuated and the plunger 22 moves upwardly, the rollers 65 engage the yoke 64 and raise it, thereby raising the member 60 and breaking the contact between contacts 56 and 57 and establishing contact between contacts 58 and 59. The plunger 22 is then held in raised position by the cam 16 engaging the roller 20, as shown in Fig. 7.

It will be noted that the rod 21 is screw threaded at 66 in the end of the lever 17, so that it is possible to adjust the position of the solenoid plunger 22 to assure operation of this switch mechanism.

A motor switch 67 is provided in the cover solenoid circuit. This switch is operatively connected to be rotated by the motor 5. It consists of a pair of collector rings 68 and 69 with suitable brushes 70 and 71. A tube 72 is provided with contacts 73 and 74 each connected to one of the collector rings. These contacts are disposed in the lower portion of the tube 72 which is disposed in upwardly extending position as indicated. Within the tube is a small quantity of mercury indicated at 75. When the motor is in operation, centrifugal force carries the mercury to the top of the tube, breaking contact between contacts 73 and 74. When the motor and drier have slowed down to a speed of about 1.5 R. P. M. the mercury falls to the bottom of the tube, establishing contact between contacts 73 and 74 to complete a circuit to provide for the energization of the cover solenoid 40.

In Figs. 11–14, I show the electrical circuit involved. The motor 5, which in this case is an alternating current motor, is provided with 3 leads 76 controlled by a multiple switch indicated at 77. This switch is actuated as is conventional in all three-phase across the line starters by a solenoid 78.

In operation the clothes to be dried are placed in the rotatable container 4. The cover 3 is placed in position and the plunger 25 is moved by hand to the position shown in Fig. 2. This locks the cover in position and closes the switch 44.

The brake lever 12 is moved to the position shown in Fig. 1, releasing the brake and moving the cam 16 to the position shown in Fig. 3, causing the switch member 60 to establish contact between the contacts 56 and 57.

The starting switch 70 which is a simple two-pole button switch is then closed and since the emergency stop switch 80 is in the position shown in Fig. 11, the circuit shown in full lines in Fig. 12 is established and the solenoid 78 is energized to close the switch 77.

When this is done, the switch 81, which is part of the regular holding switch, is closed and is held in closed position by the solenoid 78. When the switch button 79 is released and the full line circuit shown in Fig. 12 is broken, the dotted line circuit shown in Fig. 12 is established and the solenoid 78 is still energized to hold the switch 77 and the switch 81 in closed position. The motor continues to operate, although any break in the dotted line circuit of Fig. 12 will cause the switch 77 to open, stopping the motor.

It will be noted that the emergency switch 81 is in series circuit relationship in this dotted line circuit of Fig. 12 and that the motor may be stopped by merely pressing the switch 80. The motor having attained speed, the switch 67 is open.

The time switch 24 consists of stationary contacts 82 and 83 and a movable member 84, carrying a conductive contact member 85 for establishing contact between the contacts 82 and 83. This disk is rotated by suitable clock works or other mechanism not shown here, since it forms no part of the invention.

Before starting the machine, the time switch 24 is set so that the circuit between contacts 82 and 83 is open, as shown in Fig. 11. After the passage of the desired length of time, the contact between contact 82 and 83 is made by the time switch. This establishes the circuit shown in full lines in Fig. 13, energizing the brake solenoid 23. This breaks the contact between contacts 56 and 57 which breaks the circuit to solenoid 78 and opens the switch. Simultaneously the lever 17 is rotated in a clockwise direction as viewed in Fig. 3 to release the brake holding latch to permit the brake to be applied by the spring 10, stopping the motor. The switch member 60 is then moved to close the circuit between contacts 58 and 59. With the motor turned off and the brake applied, the speed of rotation drops so that the switch 67 closes. This establishes the circuit shown in full lines in Fig. 14 so that by merely pressing on the start or cover switch 79, a circuit through solenoid 40 will be established to move the plunger 39 of the solenoid 40 upwardly to retract the plunger 25 to permit the cover to be removed. The switch 44 is open at this time and this serves as a safety measure, since it is not possible to keep the machine running without having switch 44 closed. It is thus necessary, before starting again, to move plunger 25 to cover locking position, as shown in Fig. 2, before the device can be operated.

Figure 13:
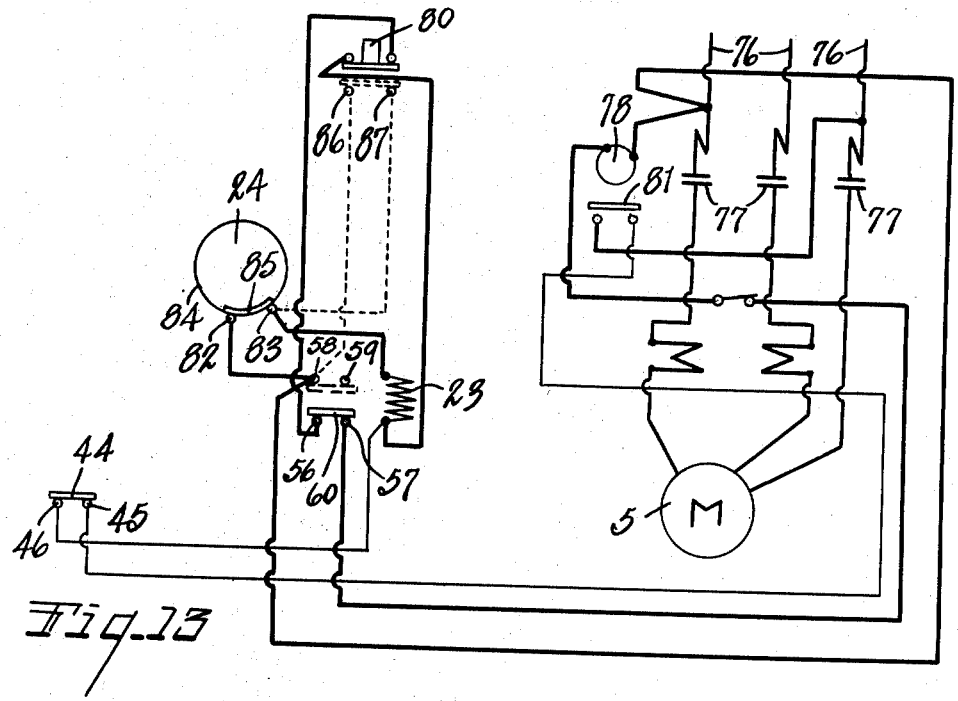
Fig. 13 is a diagrammatic view showing the circuit involved in stopping the drier or extractor at the end of a predetermined period.
Figure 14:
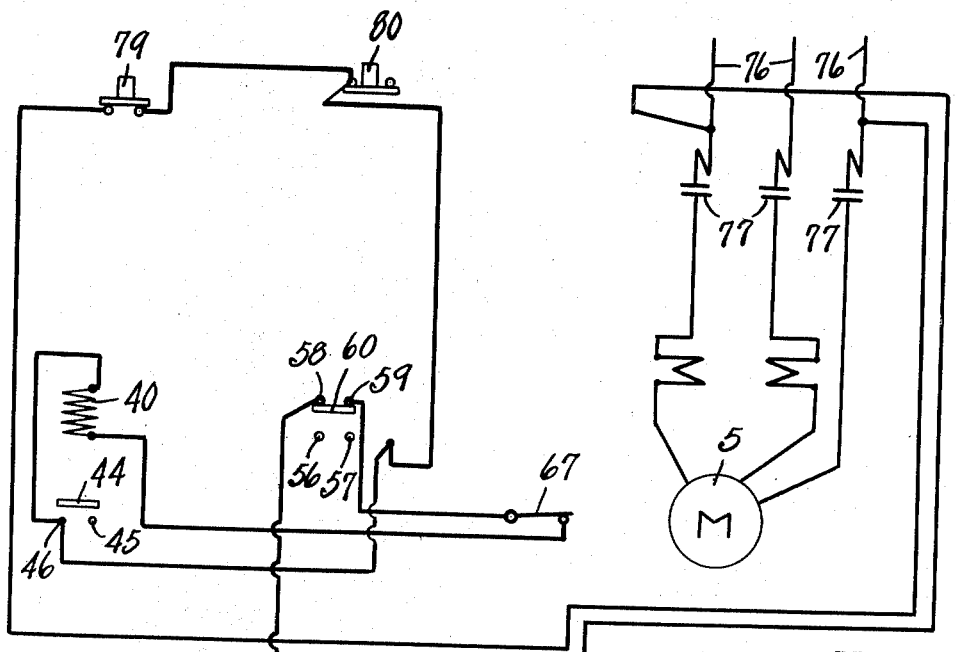
Fig. 14 is a diagrammatic view showing the circuit involved in releasing the lock for the cover of my device.

The safety stop switch 80 is arranged to establish contact between contacts 86 and 87 to close the dotted line circuit of Fig. 13 to energize solenoid 23 if the stop switch has to be resorted to.

After the cover has been removed and the clothes or the like removed from the drier or extractor and the cover is replaced and the brake is set, switch 44 will be closed and the switch member 60 will be moved to the position shown in Figs. 11, 12 and 13 to establish the motor switch holding circuit and the device will be ready for starting again.

It will be apparent that I have provided a new and improved safety control apparatus for use on centrifugal driers or extractors in that it is not possible to operate the drier or extractor without having the cover in place and until the machine has come to a substantial stop it is not possible to remove the cover. The cut-off switch and brake operate substantially simultaneously and there is suitable emergency stop equipment.

I have described my apparatus in detail, but it will be apparent that variations and modifications thereof can be made and I do not wish to be limited to the specific apparatus shown.

Having thus described my invention, what I claim as new and desire to secure by Letters Patent is:

1. In an apparatus of the class described comprising a tub, a cover therefor, and an operating motor, the combination of a lock for holding the cover in position on the tub, a switch in circuit relationship to control the motor, means connecting said switch with said cover lock whereby when the cover lock is positioned to hold the cover on the tub said switch is closed but is open when the cover lock is positioned to permit removal of the cover from the tub, means for preventing movement of said cover lock to position to hold the cover on the tub when the cover is not closing the tub, a solenoid for moving said cover lock to unlocked position upon energization of said solenoid, and a switch operatively connected to said motor to close when the motor speed drops to a predetermined point, said switch comprising contacts in series circuit relationship with the solenoid, a tube enclosing said contacts and mounted for rotation by said motor, and containing mercury sufficient to make contact between said contacts when the motor has slowed down to a predetermined speed and so disposed that upon rotation of said switch at a greater speed the mercury and the contacts are separated by centrifugal action on said mercury.

2. In an apparatus of the class described comprising a tub, a cover therefor, and an operating motor, the combination of a lock for holding the cover in position on the tub, means for preventing movement of said cover lock to position to hold the cover on the tub when the cover is not closing the tub, a solenoid for moving said cover lock to unlocked position upon energization of said solenoid, and a switch operatively connected to said motor to close when the motor speed drops to a predetermined point, said switch comprising contacts in series circuit relationship with the solenoid, a tube enclosing said contacts and mounted for rotation by said motor, and containing mercury sufficient to make contact between said contacts when the motor has slowed down to a predetermined speed and so disposed that upon rotation of said switch at a greater speed the mercury and the contacts are separated by centrifugal action on said mercury.

3. In an apparatus of the class described comprising a tub, a cover therefor, and an operating motor, the combination of a lock for holding the cover in position on the tub, means for preventing movement of said cover lock to position to hold the cover on the tub when the cover is not closing the tub, a solenoid for moving said cover lock to unlocked position upon energization of said solenoid, and a switch operatively connected to said motor to close when the motor speed drops to a predetermined point, said switch being in series circuit relationship with said solenoid.

4. In an apparatus of the class described comprising a tub, a cover therefor, a rotary container in said tube, and an operating motor therefor, the combination of a brake for said rotary container, a spring normally urging said brake to braking position, a catch for holding said brake in off position, a two-way switch which in its first position is in circuit to control said motor and in second position in series circuit relationship with a cover release solenoid, a brake solenoid disposed on energization to release said catch for holding said brake in off position and to move said two-way switch from its first position to its second position, a time switch in series circuit relationship with said brake solenoid to control the energization of said brake solenoid, a lock for holding the cover in position on the container comprising a locking plunger mounted on the tub and movable to engage the cover when it is closing the tub, a cover release solenoid having a solenoid plunger operatively connected to retract said cover locking plunger upon energization of said cover release solenoid, a cut-off switch in series circuit relationship with the first position of said two-way switch to control the motor and including a lever, a link on said solenoid plunger having a lost motion connection to said switch lever, a latch member pivoted on said switch lever and having a cooperating keeper for holding said switch in closed position and having a cam portion thereon, a cooperating cam portion on said link adapted to engage the cam portion on said latch member to release the latch member from its keeper upon energization of said brake release solenoid before the lost motion of said lost motion connection is used up, whereby on energization of said brake solenoid to open said cut-off switch said latch member is released, and a motor operated switch in series circuit relationship with said brake release solenoid comprising contacts, a tube enclosing said contacts, said tube and contacts being mounted for rotation by said motor, and mercury in said tube sufficient to make contact between said contacts when the motor is slowed down to a predetermined speed and so disposed that upon rotation of said motor switch above said predetermined speed the mercury and the contacts are separated by centrifugal action, and a manually operated switch in series circuit relationship with said brake release solenoid and the second position of said two-way switch and said motor operated switch.

5. In an apparatus of the class described comprising a tub, a cover therefor, a rotary container in said tub and an operating motor therefor, the combination of a brake for said rotary container, a spring normally urging said brake to braking position, a catch for holding said brake in off position, a two-way switch which in its first position is in circuit to control said motor and in second position in series circuit relationship with a cover release solenoid, a brake solenoid disposed on energization to release said catch for holding said brake in off position and to move said two-way switch from its first position to its second position, a time switch in series circuit relationship with said brake solenoid to control the energization of said brake solenoid, a lock for holding the cover in position on the container comprising a locking plunger mounted on the tub and movable to engage the cover when it is closing the tub, a cover release solenoid having a solenoid plunger operatively connected to retract said cover locking plunger upon energization of said cover release solenoid, a cut-off switch in series circuit relationship with the first position of said two-way switch to control the motor and including a lever, a link on said solenoid plunger having a lost motion connection to said switch lever, a latch member pivoted on said switch lever and having a cooperating keeper for holding said switch in closed position, and having a cam portion thereon, a cooperating cam portion on said link adapted to engage the cam portion on said latch member to release the latch member from its keeper upon energization of said brake release solenoid before the lost motion of said lost motion connection is used up, whereby on energization of said brake solenoid to open said cut-off switch said latch member is released, and a motor operated switch in series circuit relationship with said brake release solenoid comprising contacts, a tube enclosing said contacts, said tube and contacts being mounted for rotation by said motor, and mercury in said tube sufficient to make contact between said contacts when the motor is slowed down to a predetermined speed and so disposed that upon rotation of said motor switch above said predetermined speed the mercury and the contacts are separated by centrifugal action.

6. In an apparatus of the class described comprising a tub, a cover therefor, a rotary container in said tub and an operating motor therefor, the combination of a brake for said rotary container, a spring normally urging said brake to braking position, a catch for holding said brake in off position, a two-way switch which in its first position is in circuit to control said motor and in second position in series circuit relationship wit a cover release solenoid, a brake solenoid disposed on energization to release said catch for holding said brake in off position and to move said two-way switch from its first position to its second position, a time switch in series circuit relationship with said brake solenoid to control the energization of said brake solenoid, a lock for holding the cover in position on the container comprising a locking plunger mounted on the tub and movable to engage the cover when it is closing the tub, a cover release solenoid having a solenoid plunger operatively connected to retract said cover locking plunger upon energization of said cover release solenoid, a cut-off switch in series circuit relationship to control the motor and operatively connected to said locking plunger whereby when said plunger is retracted said cut-off switch is open and when said plunger is locking said cover on the tub the switch is closed, and a motor operated switch in series circuit relationship with said brake release solenoid comprising contacts, a tube enclosing said contacts, said tube and contacts being mounted for rotation by said motor, and mercury in said tube sufficient to make contact between said contacts when the motor is slowed down to a predetermined speed and so disposed that upon rotation of said motor switch above said predetermined speed the mercury and the contacts are separated by centrifugal action.

7. In an apparatus of the class described comprising a tub, a cover therefor, a rotary container in said tub, and an operating motor therefor, the combination of a brake for said rotary container, a spring normally urging said brake to braking position, a catch for holding said brake in off position, a two-way switch which in its first position is in circuit to control said motor and in second position in series circuit relationship with a cover release solenoid, a brake solenoid disposed on energization to release said catch for holding said brake in off position and to move said two-way switch from its first position to its second position, a time switch in series circuit relationship with said brake solenoid to control the energization of said brake solenoid, a lock for holding the cover in position on the container comprising a locking plunger mounted on the tub and movable to engage the cover when it is closing the tub, a cover release solenoid having a solenoid plunger operatively connected to retract said cover locking plunger upon energization of said cover release solenoid, a cut-off switch in series circuit relationship with the first position of said two-way switch to control the motor and operatively connected to said locking plunger whereby when said plunger is retracted said cut-off switch is open and when said plunger is locking said cover on the tube the switch is closed, and a motor operated switch in series circuit relationship with said brake release solenoid to close when the motor speed drops to a predetermined point.

8. In an apparatus of the class described comprising a tub, a cover therefor, a rotary container in said tub, and an operating motor therefor, the combination of a brake for said rotary container, a spring normally urging said brake to braking position, a catch for holding said brake in off position, a motor switch in circuit to control said motor, a brake solenoid disposed on energization to release said catch for holding said brake in off position and to open said switch, a time switch in series circuit relationship with said brake solenoid to control the energization of said brake solenoid, a lock for holding the cover in position on the container comprising a locking plunger mounted on the tub and movable to engage the cover when it is closing the tub, a cover release solenoid having a solenoid plunger operatively connected to retract said cover locking plunger upon energization of said cover release solenoid, a cut-off switch in circuit relationship to control the motor and including a lever, a link on said solenoid plunger having a lost motion connection to said switch lever, a latch member pivoted on said switch lever and having a co-operating keeper for holding said switch in closed position and having a cam portion thereon, a co-operating cam portion on said link adapted to engage the cam portion on said latch member to release the latch member from its keeper upon energization of said brake release solenoid before the lost motion of said lost motion connection is used up, whereby on energization of said brake solenoid to open said cut-off switch said latch member is released, and a motor operated switch in series circuit relationship with said brake release solenoid comprising contacts, a tube enclosing said contacts, said tube and contacts being mounted for rotation by said motor, and mercury in said tube sufficient to make contact between said contacts when the motor is slowed down to a predetermined speed and so disposed that upon rotation of said motor switch above said predetermined speed the mercury and the contacts are separated by centrifugal action.

9. In an apparatus of the class described comprising a tub, a cover therefor, a rotary container in said tub, and an operating motor therefor, the combination of a brake for said rotary container, a spring normally urging said brake to braking position, a catch for holding said brake in off position, a motor switch in circuit to control said motor, a brake solenoid disposed on energization to release said catch for holding said brake in off position and to open said switch, a time switch in series circuit relationship with said brake solenoid to control the energization of said brake solenoid, a lock for holding the cover in position on the container comprising a locking plunger mounted on the tub and movable to engage the cover when it is closing the tub, a cover release solenoid having a solenoid plunger operatively connected to retract said cover locking plunger upon energization of said cover release solenoid, a cut-off switch in circuit relationship to control the motor and including a lever, a link on said solenoid plunger having a lost motion connection to said switch lever, a latch member pivoted on said switch lever and having a co-operating keeper for holding said switch in closed position and having a cam portion thereon, a co-operating cam portion on said link adapted to engage the cam portion on said latch member to release the latch member from its keeper upon energization of said brake release solenoid before the lost motion of said lost motion connection is used up, whereby on energization of said brake solenoid to open said cut-off switch said latch member is released, and a motor operated switch in series circuit relationship with said brake release solenoid to close when the motor speed drops to a predetermined point.

10. In an apparatus of the class described comprising a tub, a cover therefor, a rotary container in said tub, and an operating motor therefor, a lock for holding the cover in position on the container comprising a locking plunger mounted on the tub and movable to engage the cover when it is closing the tub, a cover release solenoid having a solenoid plunger operatively connected to retract said cover locking plunger upon energization of said cover release solenoid, a cut-off switch in circuit relationship to control the motor and including a lever, a link on said solenoid plunger having a lost motion connection to said switch lever, a latch member pivoted on said switch lever and having a cooperating keeper for holding said switch in closed position and having a cam portion thereon, a cooperating cam portion on said link adapted to engage the cam portion on said latch member to release the latch member from its keeper upon energization of said brake release solenoid before the lost motion of said lost motion connection is used up, whereby on energization of said brake solenoid to open said cut-off switch said latch member is released, and a motor operated switch in series circuit relationship with said brake release solenoid comprising contacts, a tube enclosing said contacts, said tube and contacts being mounted for rotation by said motor, and mercury in said tube sufficient to make contact between said contacts when the motor is slowed down to a predetermined speed and so disposed that upon rotation of said motor switch above said predetermined speed the mercury and the contacts are separated by centrifugal action.

WILLIAM G. FROHWITTER.